US012017368B2

(12) United States Patent
Tang et al.

(10) Patent No.: US 12,017,368 B2
(45) Date of Patent: *Jun. 25, 2024

(54) MIX-SIZE DEPALLETIZING

(71) Applicant: FANUC CORPORATION, Yamanashi (JP)

(72) Inventors: Te Tang, Fremont, CA (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 938 days.

This patent is subject to a terminal disclaimer.

(21) Appl. No.: 17/015,817

(22) Filed: Sep. 9, 2020

(65) Prior Publication Data
US 2022/0072712 A1    Mar. 10, 2022

(51) Int. Cl.
*B25J 9/16*     (2006.01)
*G06T 7/11*     (2017.01)
*G06T 7/50*     (2017.01)
*B25J 19/02*    (2006.01)

(52) U.S. Cl.
CPC .......... *B25J 9/1687* (2013.01); *B25J 9/1697* (2013.01); *G06T 7/11* (2017.01); *G06T 7/50* (2017.01); *B25J 19/023* (2013.01); *G06T 2207/10024* (2013.01)

(58) Field of Classification Search
None
See application file for complete search history.

(56) References Cited

U.S. PATENT DOCUMENTS

| | | | | |
|---|---|---|---|---|
| 8,073,243 B2* | 12/2011 | Mareachen | .......... | H04N 19/167 382/173 |
| 2015/0178568 A1* | 6/2015 | Shellshear | .............. | G06T 7/277 382/103 |
| 2020/0156254 A1* | 5/2020 | Li | .......... | G06V 30/248 |
| 2021/0023720 A1* | 1/2021 | Du | .......... | B25J 9/1669 |
| 2021/0382497 A1* | 12/2021 | Zhi | .......... | G06V 10/26 |
| 2022/0152825 A1* | 5/2022 | Hansen | .................. | B25J 13/089 |

OTHER PUBLICATIONS

Wong et al ("SegICP: Integrated Deep Semantic Segmentation and Pose Estimation," 2017 IEEE/RSJ International Conference on Intelligent Robots and Systems, 2017, pp. 1-6) (Year: 2017).*

(Continued)

*Primary Examiner* — Leon Viet Q Nguyen
(74) *Attorney, Agent, or Firm* — John A. Miller; Shumaker, Loop & Kendrick LLP

(57) ABSTRACT

A system and method for identifying a box to be picked up by a robot from a stack of boxes. The method includes obtaining a 2D red-green-blue (RGB) color image of the boxes and a 2D depth map image of the boxes using a 3D camera, where pixels in the depth map image are assigned a value identifying the distance from the camera to the boxes. The method generates a segmentation image of the boxes by performing an image segmentation process that extracts features from the RGB image and the depth map image, combines the extracted features in the images and assigns a label to the pixels in a features image so that each box in the segmentation image has the same label. The method then identifies a location for picking up the box using the segmentation image.

20 Claims, 4 Drawing Sheets

(56) References Cited

OTHER PUBLICATIONS

Kalra et al ("Deep polarization cues for transparent object segmentation." Proceedings of the IEEE/CVF Conference on Computer Vision and Pattern Recognition. 2020, pp. 8602-8611, retrieved from the Internet on Jan. 28, 2024) (Year: 2020).*

Zhu et al. ("Image Processing for Picking Task of Random Ordered PET Drinking Bottles," Journal of Robotics, Networking and Artificial Life, 2019, pp. 38-41) (Year: 2019).*

Nakahara et al ("An object detector based on multiscale sliding window search using a fully pipelined binarized CNN on an FPGA," 2017 International Conference on Field Programmable Technology (ICFPT), 2017, pp. 168-175, doi: 10.1109/FPT.2017.8280135) (Year: 2017).*

* cited by examiner

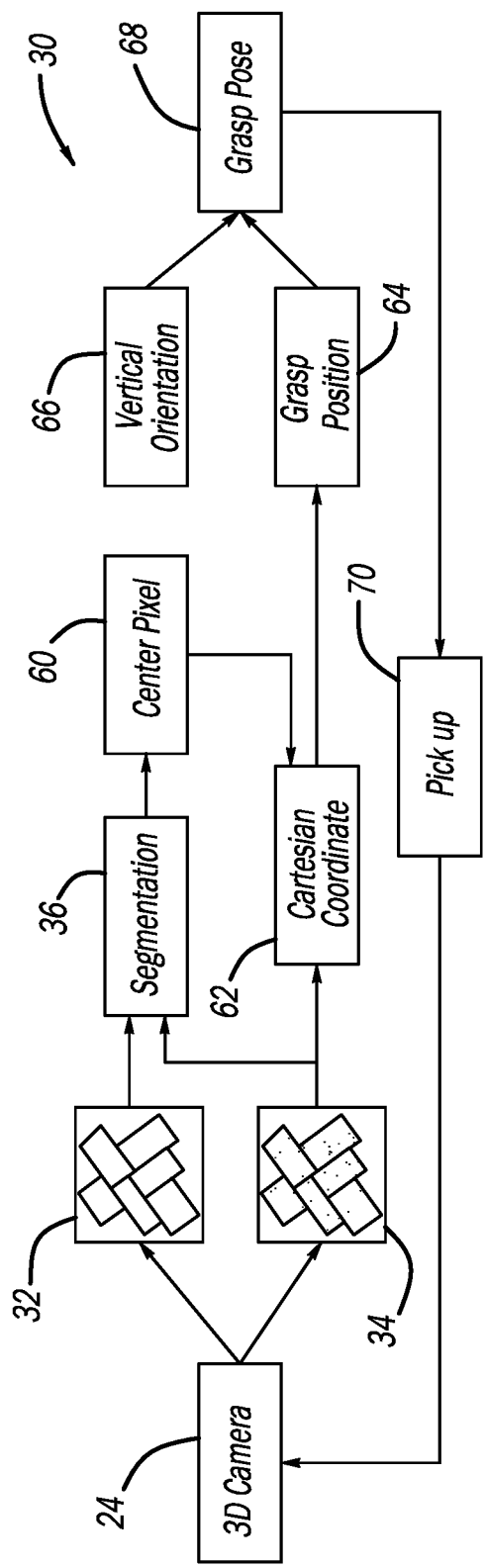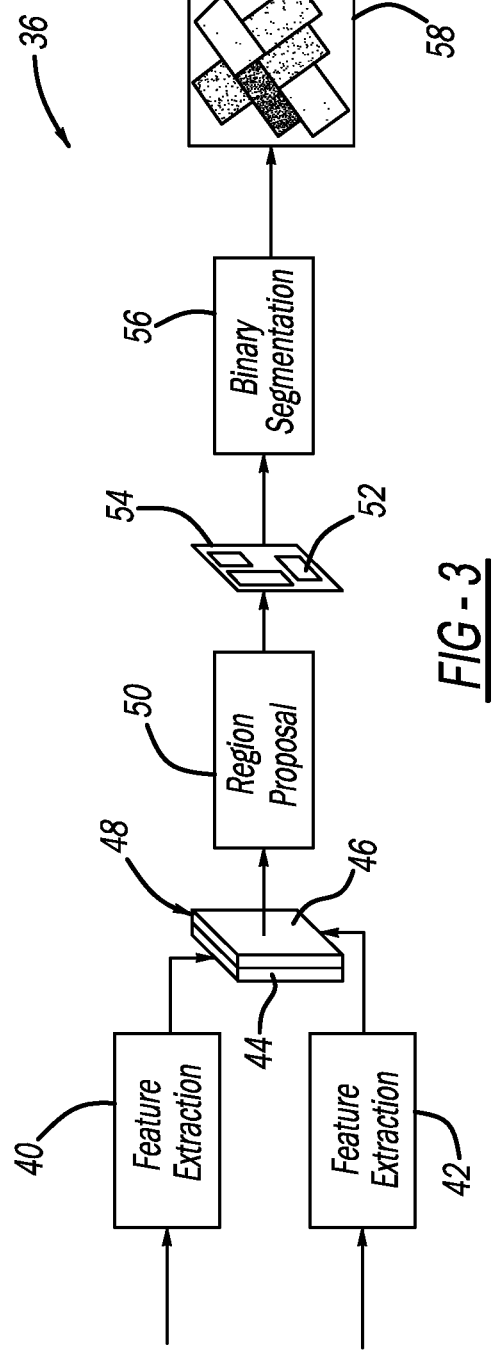

MIX-SIZE DEPALLETIZING

BACKGROUND

Field

This disclosure relates generally to a system and method for identifying a box to be picked up by a robot from a stack of boxes and, more particularly, to a system and method for identifying a box to be picked up by a robot from a stack of boxes, where the method employs an image segmentation process that assigns a label to every pixel in an image of the stack.

Discussion of the Related Art

Robots perform a multitude of commercial tasks including pick and place operations, where the robot picks up and moves objects from one location to another location. For example, the robot may pick up boxes off of a pallet and place the boxes on a conveyor belt, where the robot likely employs an end-effector with suction cups to hold the boxes. In order for the robot to effectively pick up a box, the robot needs to know the width, length and height of the box it is picking up, which is input into the robot controller prior to the pick and place operation. However, often times the boxes on the same pallet have different sizes, which makes it inefficient to input the size of the boxes into the robot during the pick and place operation. The boxes can also be placed side-by-side at the same height, where it is challenging to distinguish whether they are separate boxes or a single large box. Currently, no robot system is able to determine the size of a box it will pick up during real time.

In one known robot pick and place system, the width, length and height of the boxes the robot will be picking up is first input into the system. A 3D camera takes top down images of a stack of the boxes and generates 2D red-green-blue (RGB) color images of the boxes and 2D gray scale depth map images of the boxes, where each pixel in the depth map image has a value that defines the distance from the camera to a particular box, i.e., the closer the pixel is to the object the lower its value. A robot controller provides a series of projection templates based on the width and length of the boxes that each has a size for a certain distance between the camera and the boxes. The template for the distance of a box provided by the depth map image is moved around the color image in a search process so that when the template matches or aligns with the box in the color image, the robot controller will know the location of the box, and will use that location to define a center of the box to control the robot to pick up the box.

SUMMARY

The following discussion discloses and describes a system and method for identifying a box to be picked up by a robot from a stack of boxes. The method includes obtaining a 2D red-green-blue (RGB) color image of the boxes and a 2D depth map image of the boxes using a 3D camera, where pixels in the depth map image are assigned a value identifying the distance from the camera to the boxes. The method generates a segmentation image of the boxes by performing an image segmentation process that extracts features from the RGB image and the depth map image, combines the extracted features in the images and assigns a label to the pixels in a features image so that each box in the segmentation image has the same label. The method then identifies a location for picking up the box using the segmentation image.

Additional features of the disclosure will become apparent from the following description and appended claims, taken in conjunction with the accompanying drawings.

BRIEF DESCRIPTION OF THE DRAWINGS

FIG. 2 is a schematic block diagram of a mix-size depalletizing system that is part of the robot system shown in FIG. 1;

FIG. 3 is a schematic block diagram of a segmentation module separated from the system shown in FIG. 2;

DETAILED DESCRIPTION OF THE EMBODIMENTS

The following discussion of the embodiments of the disclosure directed to a system and method for identifying a box to be picked up by a robot from a stack of boxes, where the method employs an image segmentation process that assigns a label to every pixel in an image of the stack, is merely exemplary in nature, and is in no way intended to limit the invention or its applications or uses. For example, the system and method have application for identifying a box to be picked up by a robot. However, the system and method may have other applications.

Figure 1:
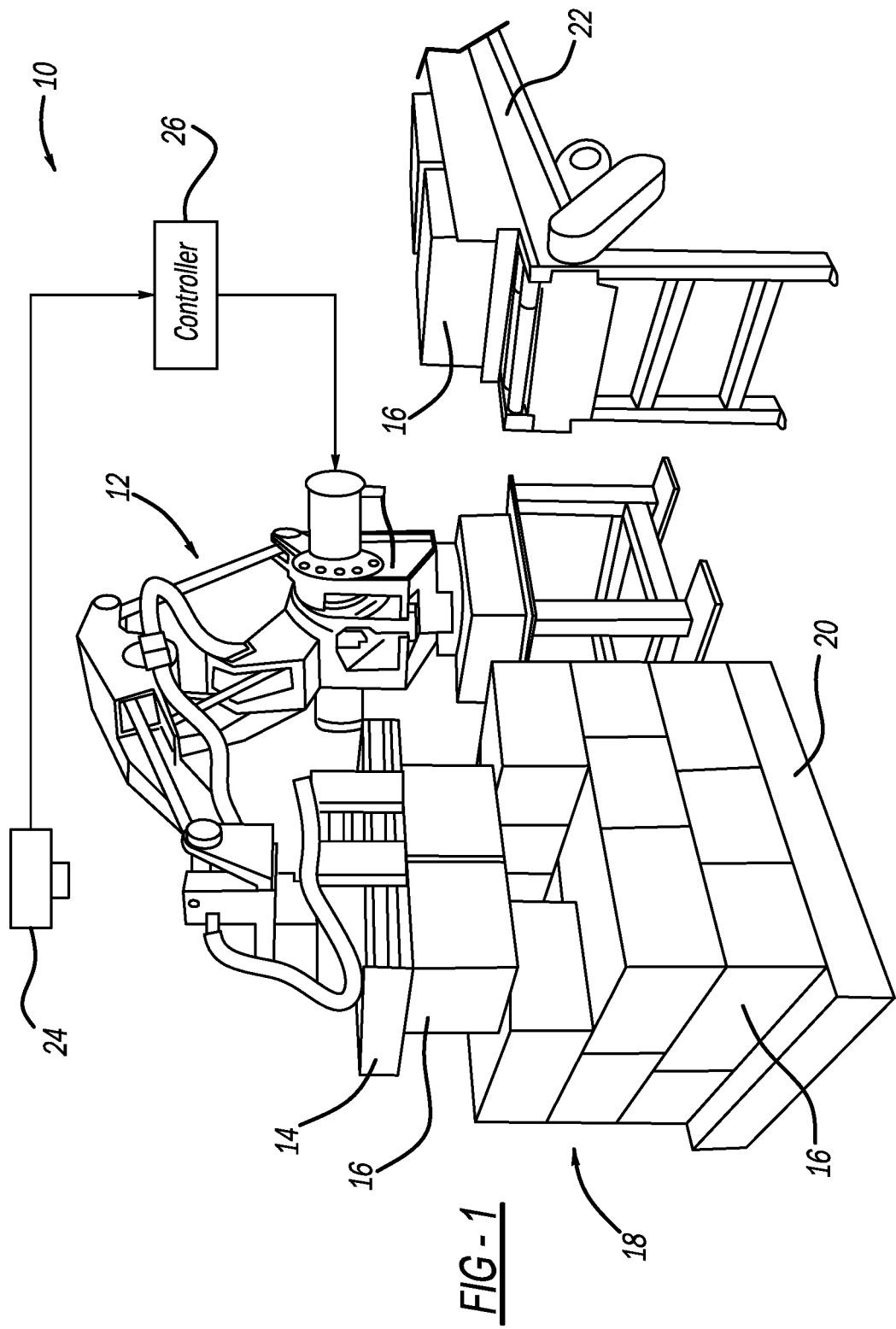
FIG. 1 is an illustration of a robot system including a robot picking up boxes off of a pallet and placing them on a conveyor belt.

FIG. 1 is an illustration of a robot system 10 including a robot 12 having an end-effector 14 that is configured for picking up boxes 16 from a stack 18 of the boxes 16 positioned on a pallet 20 and placing them on a conveyor belt 22. The system 10 is intended to represent any type of robot system that can benefit from the discussion herein, where the robot 12 can be any robot suitable for that purpose. A 3D camera 24 is positioned to take top down 2D RBG and depth map images of the stack 18 of the boxes 16 and provide them to a robot controller 26 that controls the movement of the robot 12. The boxes 16 may have different orientations on the pallet 20, may be stacked in multiple layers on the pallet 20 and may have different sizes.

As will be discussed in detail below, the robot controller 26 employs an algorithm that determines the size of each of the boxes 16 the robot 12 will be picking up without the length, width and height of the box 16 being previously input into the controller 26 and without the need to generate projection templates of the boxes 16. More specifically, the algorithm performs an image segmentation process that assigns a label to every pixel in an image such that the pixels with the same label share certain characteristics. Thus, the segmentation process predicts which pixel belongs to which of the boxes 16, where different indicia represent different boxes 16.

Modern image segmentation techniques may employ deep learning technology. Deep learning is a particular type of machine learning that provides greater learning performance by representing a certain real-world environment as a hierarchy of increasing complex concepts. Deep learning typically employs a software structure comprising several layers of neural networks that perform nonlinear processing, where each successive layer receives an output from the previous layer. Generally, the layers include an input layer that receives raw data from a sensor, a number of hidden layers that extract abstract features from the data, and an output layer that identifies a certain thing based on the feature extraction from the hidden layers. The neural networks include neurons or nodes that each has a "weight" that is multiplied by the input to the node to obtain a probability of whether something is correct. More specifically, each of the nodes has a weight that is a floating point number that is multiplied with the input to the node to generate an output for that node that is some proportion of the input. The weights are initially "trained" or set by causing the neural networks to analyze a set of known data under supervised processing and through minimizing a cost function to allow the network to obtain the highest probability of a correct output. Deep learning neural networks are often employed to provide image feature extraction and transformation for the visual detection and classification of objects in an image, where a video or stream of images can be analyzed by the network to identify and classify objects and learn through the process to better recognize the objects. Thus, in these types of networks, the system can use the same processing configuration to detect certain objects and classify them differently based on how the algorithm has learned to recognize the objects.

FIG. 2 is a schematic block diagram of a mix-size depalletizing system 30 that that is part of the controller 26 in the robot system 10 that operates to pick up the boxes 16 off of the pallet 20. The system 30 receives a 2D RGB image 32 of a top view of the boxes 16 positioned on the pallet 20 and a 2D depth map image 34 of the top view of the boxes 16 from the camera 24. The images 32 and 34 are provided to a segmentation module 36 that preforms an image segmentation process, where each pixel is assigned a certain label and where the pixels associated with the same box 16 have the same label.

FIG. 3 is a schematic block diagram of the module 36 separated from the system 30. The RGB image 32 is provided to a feature extraction module 40 and the depth map image 34 is provided to a feature extraction module 42 that perform a filtering process that extract features from the images 32 and 34. For example, the modules 40 and 42 may include learned-based neural networks that extract gradients edges, contours, elementary shapes, etc. from the images 32 and 34, and provide an extracted features image 44 of the RGB image 32 and an extracted features image 46 of the depth map image 34 in a known manner. The images 44 and 46 are aligned as a feature stack image 48 to provide a 3D augmentation matrix. The feature stack image 48 is provided to a region proposal module 50 that analyzes, using neural networks, the identified features in the RGB image 32 and the depth map image 34 to determine the location of the boxes 16 in the image 48. Particularly, the module 50 includes trained neural networks providing a number of bounding boxes, such as 50 to 100 boxes, of different sizes, i.e., boxes having various lengths and widths, that are used to identify the probability that a box 16 exists at a certain location in the image 48. The region proposal module 50 employs a sliding search window template, well known to those skilled in the art, where a search window including all of the bounding boxes is moved over the feature stack image 48, for example, from a top left of the image 48 to a bottom right of the image 48, to look for features that identify the probable existence of one of the boxes 16.

The sliding window search produces a bounding box image 54 including a number of bounding boxes 52 that each surrounds a predicted object in the image 48, where the number of bounding boxes 52 in the image 54 may be reduced each time the robot 12 removes one of the boxes 16 from the stack 18. The module 50 parameterizes a center location (x, y), width (w) and height (h) of each box 52 and provides a prediction confidence value between 0% and 100% that a box exists in the box 52. The image 54 is provided to a binary segmentation module 56 that estimates, using a neural network, whether a pixel belongs to the box 16 in each of the bounding boxes 52 to eliminate background pixels in the box 52 that are not part of the object 16. The remaining pixels in the image 54 in each of the boxes 52 are assigned a value for a particular box 16 so that a 2D segmentation image 58 is generated that identifies the boxes 16 by different indicia, such as color. The image segmentation process as described is a modified form of a deep learning mask R-CNN (convolutional neural network).

The 2D segmentation image 58 is then provided to a center pixel module 60 that determines which segmented box in the image 58 has the highest confidence value for being a box and provides the x-y coordinate of the center pixel for the selected box 16. The identified center pixel of the selected box 16 is provided to a Cartesian coordinate module 62 along with the depth map image 34 that calculates the x-y-z Cartesian coordinate of the center pixel of that box 16, where the depth map image 34 knows each pixels location in the real world. The x-y-z coordinate of the center pixel for that box 16 is then used to identify the x-y-z grasp position in a grasp position module 64 for positioning the end-effector 14. The grasp position of the end-effector 14 and a known vertical orientation of the box 16 from an orientation module 66 determines the grasp pose or orientation of the end-effector 14 in a grasp pose module 68, where the grasp pose includes the x-y-z coordinates and the yaw, pitch and roll of the end-effector 14 to provide the approach orientation to the box 16 of the end-effector 14, and where other orientations of the boxes 16 can be provided, such as a normal orientation of a box surface, instead of the vertical orientation. The robot motion is performed at pick-up module 70 to pick up the box 16. The robot 12 then signals the camera 24 to provide new RGB and depth map images, where the previously picked-up box 16 has been removed from the stack 18. This process is continued until all of the boxes 16 have been picked up.

Figure 4:
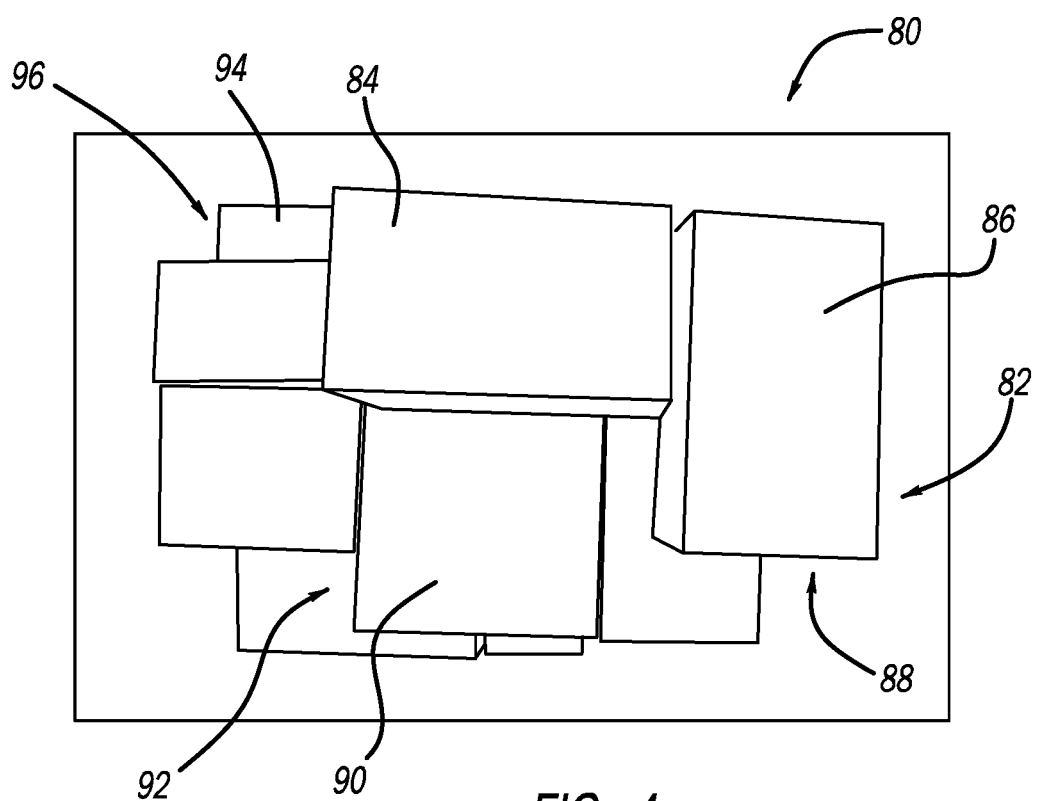
FIG. 4 is a top down RGB image of a stack of boxes having three layers.

As the boxes 16 are removed from the stack 18 by the robot 12, boxes 16 in lower layers of the stack 18 may become partially exposed to the camera 24 and be segmented by the segmentation module 36. FIG. 4 is a top down RGB image 80 of a stack 82 of boxes 84 illustrating this, where boxes 86 in a top layer 88 partially cover boxes 90 in a middle layer 92 and boxes 94 in a bottom layer 96, where the boxes 90 and 94 may be segmented by the segmentation module 36 and the robot 12 may try to pick them up before the boxes 86 have been removed. The partially segmented boxes may look like complete boxes to the camera 24, but since part of those boxes is occluded, the proper center of the boxes cannot be determined, and the orientation of the end-effector 14 may not be properly positioned to pick up those boxes.

Figure 5:
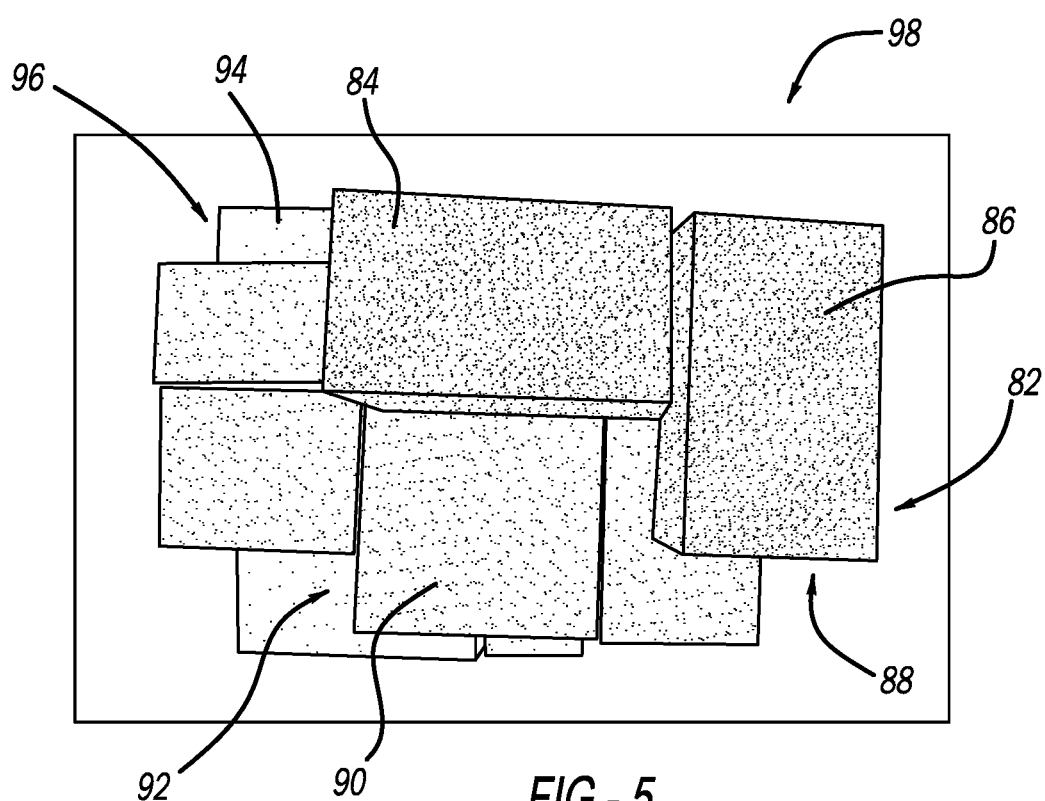
FIG. 5 is a top down depth map image of the stack of boxes shown in FIG. 4.

As will be discussed in detail below, this problem is addressed by using the depth map image of the stack 18 to crop out the top layer of the boxes 84 and only segmenting those boxes in the top layer until they are removed from the stack 82 by the robot 12. FIG. 5 is a depth map image 98 of the stack 82, where the boxes 84 in a particular one of the layers 88, 92 and 96 have the same shading.

Figure 6:
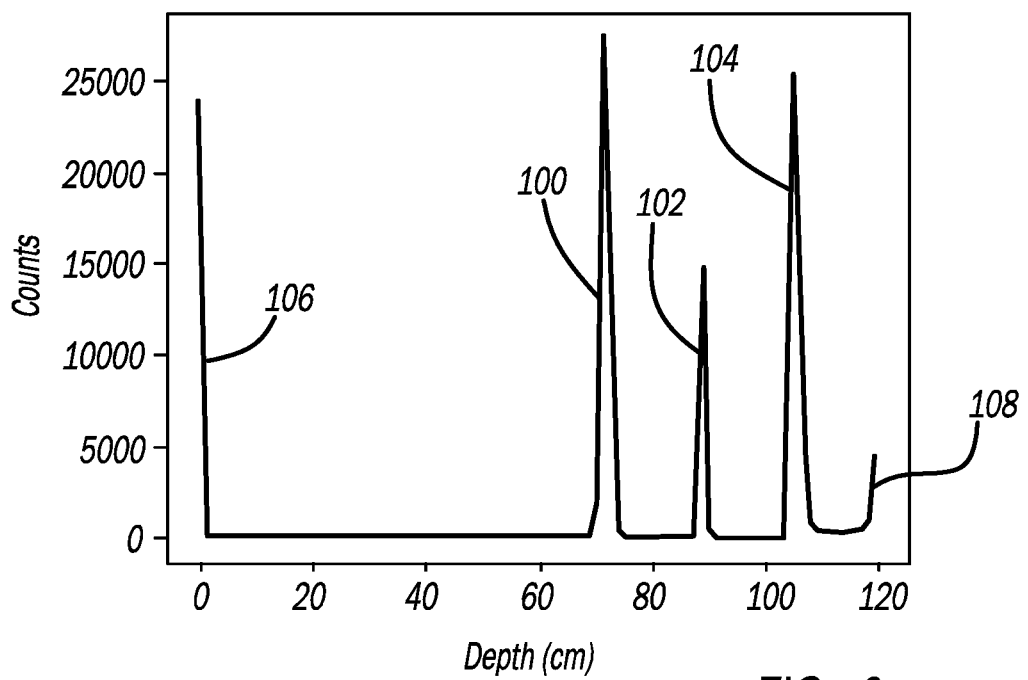
FIG. 6 is a histogram graph with depth on the horizontal axis and counts on the vertical axis showing count peaks of boxes in the stack.

FIG. 6 is a histogram with depth on the horizontal axis and counts on the vertical axis, where a separate "bar" is defined, for example, every centimeter of depth from the camera 24. Each pixel in the depth map image 98 is assigned a value depending on its distance from the camera 24, and each pixel in the depth map image 98 is a count and each count is assigned to a bar depending on its value. Therefore, the pixels for the boxes 84 in a particular layer will be assigned to the same bar or surrounding bars. The histogram shows a peak 100 of the counts for the top layer 88 at a depth of 70 cm, a peak 102 of the counts for the middle layer 92 at a depth of 90 cm, and a peak 104 of the counts for the bottom layer 96 at a depth of 105 cm, where a peak 106 at zero cm from the camera 24 includes counts from pixels that cannot be measured and are dismissed and a peak 108 at 120 cm from the camera 24 is the ground and is also dismissed.

Figure 7:
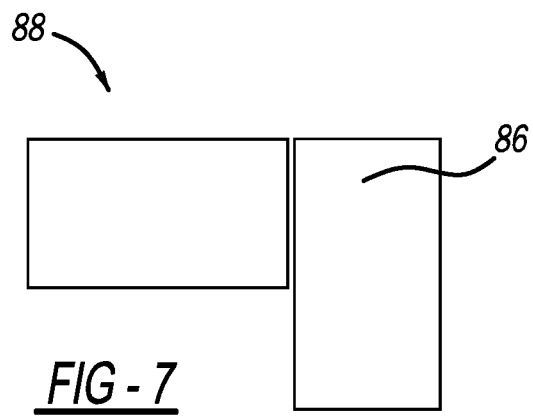
FIG. 7 is a cropped top down RGB image of a top layer of the stack shown in FIG. 4.
Figure 8:
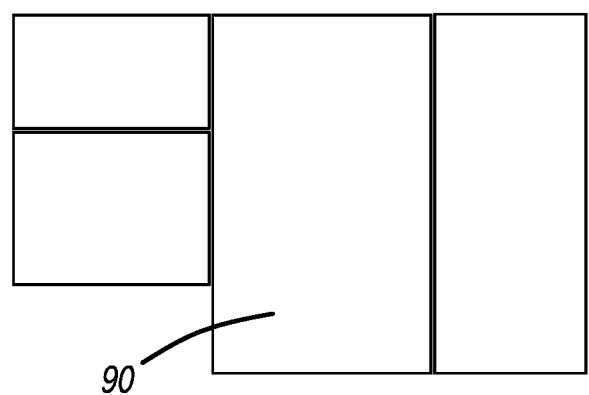
FIG. 8 is a cropped top down RGB image of a middle layer of the stack shown in FIG. 4.

The controller 26 identifies the closest peak as the top layer of the boxes 84, which is the peak 100, and crops all of the boxes associated with that peak value or surrounding values out of the image as shown in FIG. 7. Now, there are no boxes in the cropped image that are covered by other boxes, and the segmentation process can be performed on the cropped image in the manner discussed above. Once all of the boxes 84 have been picked up in the cropped image, the controller 26 will generate another histogram, where the closest peak will now be the peak 102 for the middle layer of the boxes 84, which is cropped out as shown in FIG. 8.

As will be well understood by those skilled in the art, the several and various steps and processes discussed herein to describe the disclosure may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for picking up an object box from a group of boxes, said method comprising:
    obtaining a 2D red-green-blue (RGB) color image of the boxes using a 3D camera;
    obtaining a 2D depth map image of the boxes using the 3D camera, where pixels in the depth map image are assigned a value identifying the distance from the camera to the boxes;
    generating a segmentation image of the boxes by performing an image segmentation process that extracts features from the RGB image and the depth map image, combines the extracted features in the images and assigns a label to pixels in the segmentation image so that the pixels in each box in the segmentation image have the same label and the pixels of different boxes in the segmentation image have different labels including boxes that have a same or similar shape;
    identifying a location for picking up the box using the segmentation image; and
    separating a top layer of the boxes that are stacked on top of other boxes in the group of boxes from the color image before generating the segmentation image of the boxes, wherein generating a segmentation image of the boxes includes generating a segmentation image of the top layer of the boxes.

2. The method according to claim 1 wherein generating a segmentation image includes using a deep learning mask R-CNN (convolutional neural network).

3. The method according to claim 1 wherein generating a segmentation image includes providing a plurality of bounding boxes, aligning the bounding boxes to the extracted features and providing a bounding box image that includes bounding boxes surrounding the object boxes.

4. The method according to claim 3 wherein generating a segmentation image includes determining a probability that an object box exists in each bounding box.

5. The method according to claim 3 wherein generating a segmentation image includes removing pixels from each bounding box in the bounding box image that are not associated with an object box.

6. The method according to claim 1 wherein as boxes are picked up from the group of boxes, lower layers of the stack of the boxes become the top layer of the boxes.

7. The method according to claim 1 wherein separating a top layer includes counting pixels in the depth map image that have similar depth values and identifying the top layer by a group of pixels having a depth value indicating they are the closest to the camera.

8. The method according to claim 7 wherein the groups of pixels having similar depth values are identified by a histogram.

9. The method according to claim 1 wherein generating a segmentation image includes identifying a center pixel of each object in the bounding boxes and wherein identifying a location for picking up the object includes identifying a center pixel of one of the objects in the segmentation image and calculating x-y-z coordinates of the center pixel using the location of that center pixel and the depth map image.

10. The method according to claim 9 wherein identifying a location for picking up the box includes determining a grasp pose for picking up the box using the x-y-z coordinates and a pitch, yaw and roll position.

11. The method according to claim 10 wherein the box is picked up by a robot and the grasp pose determines the pose of a robot end-effector.

12. A method for picking up an object box from a group of boxes using a robot, said method comprising:
    obtaining a 2D red-green-blue (RGB) color image of the boxes using a 3D camera;
    obtaining a 2D depth map image of the boxes using the 3D camera, where pixels in the depth map image are assigned a value identifying the distance from the camera to the boxes;
    generating a segmentation image of the boxes by performing an image segmentation process using a deep learning convolutional neural network that extracts features from the RGB image and the depth map image, combines the extracted features in the images and assigns a label to pixels in the segmentation image so that the pixels in each box in the segmentation image have the same label and the pixels of different boxes in the segmentation image have different labels including boxes that have a same or similar shape; and identifying a location for picking up the box using the segmentation image, wherein obtaining a color image, obtaining a depth map image, generating a segmentation image and identifying a location for picking up the box are performed each time a box is picked up from the group of boxes by the robot.

13. The method according to claim 12 wherein generating a segmentation image includes providing a plurality of bounding boxes, aligning the bounding boxes to the extracted features, providing a bounding box image that includes bounding boxes surrounding the object boxes, determining the probability that an object box exists in each bounding box and removing pixels from each bounding box in the bounding box image that are not associated with an object box.

14. The method according to claim 12 further comprising separating a top layer of the boxes that are stacked on top of other boxes in the group of boxes from the color image before generating the segmentation image of the boxes by counting pixels in the depth map image that have similar depth values and identifying the top layer by a group of pixels having a depth value indicating they are the closest to the camera, wherein the groups of pixels having similar depth values are identified by a histogram, and wherein generating a segmentation image of the boxes includes generating a segmentation image of the top layer of the boxes.

15. The method according to claim 14 wherein as boxes are picked up from the group of boxes, lower layers of the stack of the boxes become the top layer of the boxes.

16. A robot system for picking up an object box from a group of boxes using a robot, said system comprising:

a 3D camera that provides a 2D red-green-blue (RGB) color image and a 2D depth map image of the boxes;

a deep learning convolutional neural network that generates a segmentation image of the boxes by performing an image segmentation process that extracts features from the RGB image and the depth map image, combines the extracted features in the images and assigns a label to pixels in the segmentation image so that the pixels in each box in the segmentation image have the same label and the pixels of different boxes in the segmentation image have different labels including boxes that have a same or similar shape; and means for identifying a location for picking up the box using the segmentation image, wherein obtaining a color image, obtaining a depth map image, generating a segmentation image and identify a location for picking up the box are performed each time a box is picked up from the group of boxes by the robot.

17. The system according to claim 16 wherein the image segmentation process provides a plurality of bounding boxes, aligns the bounding boxes to the extracted features, provides a bounding box image that includes bounding boxes surrounding the object boxes, determines the probability that an object box exists in each bounding box and removes pixels from each bounding box in the bounding box image that are not associated with an object box.

18. The system according to claim 16 further comprising means for separating a top layer of the boxes that are stacked on top of other boxes in the group of boxes from the color image before generating the segmentation image of the boxes by counting pixels in the depth map image that have similar depth values and identifying the top layer by a group of pixels having a depth value indicating they are the closest to the camera, wherein the groups of pixels having similar depth values are identified by a histogram, and wherein generating a segmentation image of the boxes includes generating a segmentation image of the top layer of the boxes.

19. A method for picking up an object box from a group of boxes, said method comprising:

obtaining a 2D red-green-blue (RGB) color image of the boxes using a 3D camera;

obtaining a 2D depth map image of the boxes using the 3D camera, where pixels in the depth map image are assigned a value identifying the distance from the camera to the boxes;

generating a segmentation image of the boxes by performing an image segmentation process that extracts features from the RGB image and the depth map image, combines the extracted features in the images and assigns a label to pixels in the segmentation image so that each box in the segmentation image has the same label;

identifying a location for picking up the box using the segmentation image; and separating a top layer of the boxes that are stacked on top of other boxes in the group of boxes from the color image before generating the segmentation image of the boxes, wherein generating a segmentation image of the boxes includes generating a segmentation image of the top layer of the boxes.

20. A method for picking up an object box from a group of boxes, said method comprising:

obtaining a 2D red-green-blue (RGB) color image of the boxes using a 3D camera;

obtaining a 2D depth map image of the boxes using the 3D camera, where pixels in the depth map image are assigned a value identifying the distance from the camera to the boxes;

generating a segmentation image of the boxes by performing an image segmentation process that extracts features from the RGB image and the depth map image, combines the extracted features in the images and assigns a label to pixels in the segmentation image so that each box in the segmentation image has the same label, wherein generating a segmentation image includes identifying a center pixel of each object in the bounding boxes;

identifying a location for picking up the box using the segmentation image, wherein identifying a location for picking up the object includes identifying a center pixel of one of the objects in the segmentation image, calculating x-y-z coordinates of the center pixel using the location of that center pixel and the depth map image, and determining a grasp pose for picking up the box using the x-y-z coordinates and a pitch, yaw and roll position.

* * * * *